(12) United States Patent  
Barat

(10) Patent No.: US 7,920,980 B2
(45) Date of Patent: Apr. 5, 2011

(54) SYSTEM AND METHOD FOR DYNAMICALLY PROVIDING FEEDBACK

(75) Inventor: Venkatesh Barat, New Delhi (IN)

(73) Assignee: General Electric Co., Schenectady, NY (US)

( * ) Notice: Subject to any disclaimer, the term of this patent is extended or adjusted under 35 U.S.C. 154(b) by 270 days.

(21) Appl. No.: 12/174,836

(22) Filed: Jul. 17, 2008

(65) Prior Publication Data

US 2010/0016995 A1 Jan. 21, 2010

(51) Int. Cl.
 *G06F 19/00* (2006.01)
(52) U.S. Cl. ........................................................ 702/81
(58) Field of Classification Search .................. 702/81, 702/182–185
See application file for complete search history.

(56) References Cited

U.S. PATENT DOCUMENTS

| 4,588,383 A | 5/1986 | Parker et al. |
| 6,173,320 B1 | 1/2001 | Cunningham |
| 2004/0120557 A1* | 6/2004 | Sabol et al. ................... 382/128 |

* cited by examiner

*Primary Examiner* — Edward Raymond
(74) *Attorney, Agent, or Firm* — Rick R. Wascher

(57) ABSTRACT

A method for dynamically providing feedback is presented. The method includes monitoring one or more steps performed by one or more components in a machine, where the one or more steps are associated with a workflow. Further, the method includes analyzing the one or more steps performed by the one or more components to dynamically determine feedback based on the one or more steps performed by the one or more components, where the feedback comprises other steps in the workflow. In addition, the method includes presenting the feedback. Systems and computer-readable medium that afford functionality of the type defined by this method is also contemplated in conjunction with the present technique.

25 Claims, 4 Drawing Sheets

| Message | What is happening? |
|---|---|
| "SELECTION NOT ALLOWED. ACQUISITION IS IN PROGRESS" | • You tried to enter spin mode with X-ray switch pressed. This is not allowed<br>• You tried to reselect a trajectory with X-ray switch pressed. This is not allowed |
| "SELECTION NOT ALLOWED. RELEASE TEST BUTTON" | • You tried to enter spin mode with the Test button pressed. This is not allowed<br>• You tried to reselect a trajectory with the Test button pressed. This is not allowed |
| "SELECTION NOT ALLOWED. TABLE IS ROTATED" | • You tried to enter spin mode with the table rotated. This is not allowed |
| "RECORD ACQUISITION NOT ALLOWED. SPIN TEST IS IN PROGRESS" | • You tried to perform a record during the test phase. This is not allowed |
| "RELEASE FLUORO SWITCH FOR SPIN ACQUISITION" | • You tried to select a new spin position during a fluoro acquisition. This is not allowed |
| "RELEASE TEST BUTTON FOR SPIN ACQUISITION" | • You tried to perform a record during the test phase. This is not allowed |

FIG. 4

SYSTEM AND METHOD FOR DYNAMICALLY PROVIDING FEEDBACK

BACKGROUND

This disclosure relates generally to device workflow, and more particularly to a design of a method configured to aid in enhancing device workflow.

As will be appreciated, machines and/or other equipment, such as those found in the medical domain, for example, often get complex and confusing to use. Despite intense training and experience, there are times when the best skilled operators are unable to decide on the next steps to be taken during operation, utilization and/or assembly of a machine or equipment. Faulty operations may lead to loss of productivity, and thereby resulting in inevitable financial and/or regulatory consequences.

Currently available techniques typically address the problem of handling complex devices or machines via classroom training, on-the-job training, and/or mentoring. Static labeling of device components has also been employed to address the problems that arise when dealing with complex machines. Moreover, a new user may also approach an experienced user for expert advice when working with complex machines. However, use of the currently available techniques disadvantageously leads to loss of productivity and down time of the machines, thereby diminishing effectiveness of workflows.

It may therefore be desirable to develop a design of a system and a method configured to dynamically provide feedback to a user operating the machines or equipment. More particularly, it may be desirable to develop a system configured to proactively and/or reactively offer advisory prompts to the user based upon a sequence of operations performed by components in the machines.

BRIEF DESCRIPTION

In accordance with aspects of the present technique, a method for dynamically providing feedback is presented. The method includes monitoring one or more steps performed by one or more components in a machine, where the one or more steps are associated with a workflow. Further, the method includes analyzing the one or more steps performed by the one or more components to dynamically determine feedback based on the one or more steps performed by the one or more components, where the feedback comprises other steps in the workflow. In addition, the method includes presenting the feedback. Computer-readable medium that afford functionality of the type defined by this method is also contemplated in conjunction with the present technique.

In accordance with further aspects of the present technique, a method for dynamically providing feedback is presented. The method includes operatively associating one or more feedback agents with one or more components in a machine. Moreover, the method includes selecting a mode of presenting feedback. In addition, the method includes monitoring one or more steps performed by one or more components in a machine, where the one or more steps are associated with a workflow. Further, the method includes analyzing the one or more steps performed by the one or more components to dynamically determine feedback based on the one or more steps performed by the one or more components, where the feedback comprises other steps in the workflow. The method also includes presenting the feedback.

In accordance with yet another aspect of the present technique, a system for dynamically providing feedback is presented. The system includes a data repository configured to facilitate generation of feedback based on one or more steps performed by one or more components in a machine. Additionally, the system includes one or more feedback agents associated with the one or more components in the machine, where the one or more feedback agents are operatively coupled to the data repository, and where the one or more feedback agents are configured to aid in dynamically providing feedback based on the one or more steps performed by one or more components in a machine.

DRAWINGS

These and other features, aspects, and advantages of the present invention will become better understood when the following detailed description is read with reference to the accompanying drawings in which like characters represent like parts throughout the drawings, wherein:

FIG. 4 is a diagrammatic illustration of one example of feedback provided by the system for dynamically providing feedback of FIG. 1, in accordance with aspects of the present technique.

DETAILED DESCRIPTION

Figure 1:
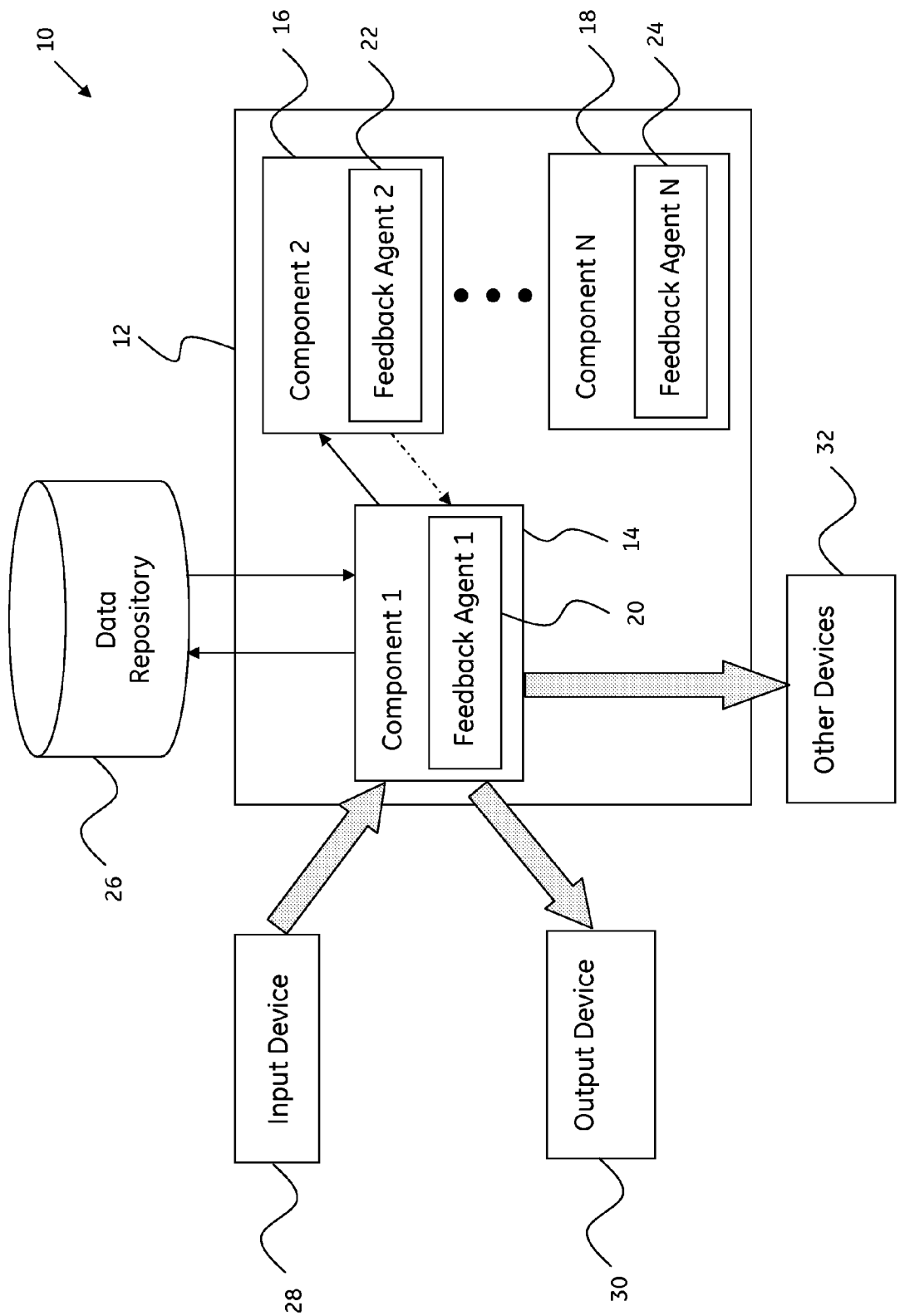
FIG. 1 is a block diagram of a system for dynamically providing feedback, in accordance with aspects of the present technique.

FIG. 1 is a block diagram of an exemplary system 10, in accordance with aspects of the present technique. More particularly, the system 10 may be configured to aid in providing feedback based upon a step or sequence of steps performed by a machine or device to a user of the system 10. In other words, the exemplary system 10 may be configured to aid a user, for example, in configuring a system or other equipment by dynamically providing proactive and/or reactive feedback to the user, thereby enhancing workflow.

As will be appreciated, machines and/or other equipment, such as those found in the medical domain, for example, often get complex and confusing to use. Despite intense training and experience, there are times when the best skilled operators are unable to decide on the next steps to be taken during operation and/or utilization of the machine or equipment. Faulty operations may lead to loss of productivity, and thereby resulting in inevitable financial and/or regulatory consequences. In accordance with aspects of the present technique, a system 10 configured to aid a machine or equipment by dynamically offering statistically confident feedback to users of the machine or equipment is presented. It may be noted that the feedback to the user may include prompts and/or advice. Additionally, the system 10 may also be configured to provide feedback to the user in a proactive mode, a reactive mode, a demonstration mode, or combinations thereof. In accordance with aspects of the present technique, the system 10 for dynamically providing feedback may be configured for use in serviceability applications, clinical workflow applications, and assembly line workflow applications, to name a few.

As noted hereinabove, the system 10 for dynamically providing feedback to the user may be configured to aid a machine or equipment to dynamically offer statistically confident feedback to the user in a proactive mode, a reactive mode, a demonstration mode, or combinations thereof. In accordance with aspects of the present technique, this feedback mechanism may be achieved via introduction of a feedback agent in the machine or equipment under consideration. By way of example, if the machine is configured to include one or more components, then the one or more components in the machine may be configured to include a corresponding feedback agent, where the feedback agent is configured to provide feedback to the user. The feedback agent may be configured to dynamically provide feedback to the user via a mechanism of continual prompting, feedback and learning. In addition, the feedback agent may be configured to include a mechanism that is capable of comparing real data with predetermined thresholds. Further, the feedback agent may also have rule-based decision capabilities. In one example, the feedback agent may include a Questra agent.

With continuing reference to FIG. 1, reference numeral 12 may be representative of a machine under consideration by a user (not shown in FIG. 1). The machine 12 may include one or more components, such as component machine parts, for example. In the example illustrated in FIG. 1, the machine 12 is depicted as including a first component 14, a second component 16, and an $N^{th}$ component 18. Furthermore, each of the components 14, 16, 18 may be configured to include a corresponding feedback agent. By way of example, the first component 14 may include a first feedback agent 20, while the second component 16 may include a second feedback agent 22. In a similar fashion, the $N^{th}$ component 18 may include an $N^{th}$ feedback agent 24. These feedback agents 20, 22, 24 may be configured to provide the user with feedback regarding the next step or sequence of steps in a workflow. It may be noted that although the machine 12 in FIG. 1 is shown as include a feedback agent corresponding to each of the components 14, 16, 18, in certain other embodiments, only a subset of the components in the machine 12 may include corresponding feedback agents.

As noted hereinabove, the feedback agents 20, 22, 24 are configured to provide feedback to the user. More particularly, in accordance with aspects of the present technique, the feedback agents 20, 22, 24 may be configured to provide feedback to the user based on a step or sequence of steps performed by the components 14, 16, 18. Further, in one embodiment, the system 10 may be configured to provide feedback to the user in the form of a visual output, an audio output, or a combination thereof. It may be noted that the visual and/or audio outputs may be in the form of visual and/or audio prompts.

Moreover, the feedback agents 20, 22, 24 may be configured to proactively provide the visual and/or audio prompts to the user. In addition, the feedback agents 20, 22, 24 may also be configured to provide the visual and/or audio prompts to the user in a reactive or in an "on demand" manner. In other words, the feedback agents 20, 22, 24 may be configured to operate in one or more modes. A first mode of operation of the feedback agents 20, 22, 24 may include a "proactive immediate" mode of operation. In this mode, upon completion of operation of a step or a sequence of steps by the components 14, 16, 18 in a workflow, the feedback agents 20, 22, 24 may be configured to proactively provide the user with prompts representative of possible next steps in the workflow. Additionally, the feedback agents 20, 22, 24 may also be configured to provide information regarding possible drawbacks associated with the possible next steps, thereby aiding the user in making an informed choice regarding the next steps in the workflow.

In a second mode of operation, "a proactive delayed" mode, the feedback agents 20, 22, 24 may be configured to proactively provide feedback to the user regarding next steps in a workflow and corresponding drawbacks once the components in the machine 12 have completed a step or a sequence of steps and there is a delay in performing a subsequent step. In other words, the feedback agents 20, 22, 24 may be configured to monitor the steps performed by the component and also monitor any delays in execution of a subsequent step or sequence of steps. Once a particular step or sequence of steps has been performed by a component, the corresponding feedback agent may be configured to monitor any delays in execution of a next step by that component. This delay in the execution of steps in the workflow may include a configurable delay, in certain embodiments.

A third mode of operation may include a "reactive" mode or "on demand" mode of operation. In this mode, the feedback agents 20, 22, 24 may be configured to provide feedback to the user in response to receipt of an explicit request from the user. The request from the user may include a voice command or other mechanical stimulations.

In yet another mode of operation, a "demonstration" mode, the feedback agents 20, 22, 24 may be configured to aid the machine 12 in recording and executing a sequence of steps in a workflow performed by the components 14, 16, 18. In one embodiment, the feedback agents 20, 22, 24 may be configured to allow the machine 12 to operate in the demonstration mode. In one embodiment, the machine 12 may be configured to operate in the demonstration mode in response to a request by the user, for instance.

Furthermore, in accordance with aspects of the present technique, the system 10 may be configured to allow the user to select a mode of operation, where the modes of operation may include the proactive modes, the reactive mode, the demonstration mode, or combinations thereof. More particularly, the system 10 may be configured to allow the user to select the mode of operation to provide audio and/or visual feedback to the user at any time. The user may initiate this switch in the mode of operation through an audible or mechanical trigger on a component or a predefined set of components in the machine 12. Moreover, the system 10 may also be configured to allow the user to stop any of the modes of operation at any time. It may be noted that the actual switch of the current mode of operation or stopping of the current mode of operation may be effective only when the stimulated component verifies validity of the selected mode of operation.

In accordance with further aspects of the present technique, the feedback agents 20, 22, 24 may be configured to be operationally coupled with a data repository 26. In certain embodiments, the data repository 26 may include a probabilistic database. Moreover, in one embodiment, a high performance central database that is capable of arranging data in terms of complex graphs and topologies and performing statistical analysis. It may be noted that a cluster of databases may also be employed. The data repository 26 may include an Oracle data warehouse, for example. The feedback agents 20, 22, 24 may be operationally coupled to the data repository via wired means and/or wireless means. Furthermore, in certain embodiments, the data repository 26 may be disposed in the same facility as the machine 12, while in certain other embodiments, the data repository 26 may be disposed at a location that is geographically separate from the machine 12.

The data repository 26 may be configured to include pre-stored information configured to aid the feedback agents 20, 22, 24 in providing the user relevant feedback. In other words the data repository 26 may be populated with information associated with salient parts of the machine 12. By way of example, information regarding optimum assembly workflows may be stored in the data repository 26. Also, the pre-stored information may include component-wise workflows and/or sequence rules. Moreover, the data repository 26 may be configured to include serviceability information configured to aid a user, such as a field engineer, in the servicing of a machine, such as the machine 12. In addition, the data repository 12 may also include information regarding predetermined optimum clinical workflows configured to aid a user, such as a clinician, in the use of complex medical equipment. Further, the data repository 26 may also be configured to include "learnt" data, where the learnt data may include input from the one or more components in the machine 12. Moreover, the data repository 26 may also be configured to update its knowledge base by adding data computed via use of statistical analysis. In other words, the computed data may include inferences obtained from pre-stored and/or learnt data. Additionally, the computed data may also include workflow optimization inference for enhancements to the workflow process associated with each of the components in the machine 12. The working of the data repository 26 will be described in greater detail with respect to FIGS. 2-4.

As described hereinabove, the feedback agents 20, 22, 24 may be configured to operate in various modes to proactively and/or reactively provide the user with feedback regarding subsequent steps or sequence of steps in a given workflow. Also, as previously noted, the mode of operation of the system for providing feedback to the user may be dynamically selected. Furthermore, the system 10 via use of the feedback agents 20, 22, 24 may be configured to provide feedback to the user based on a step or sequence of steps performed by the components 14, 16, 18 in the machine 12. Accordingly, the feedback agents 20, 22, 24 may be configured to monitor the steps performed by the respective components 14, 16, 18. In addition, the feedback agents 20, 22, 24 may be configured to communicate information regarding the completed sequence of steps completed by the corresponding components 20, 22, 24 to the data repository 26. The data repository 26 may be configured to process information regarding the completed sequence of steps and respond by providing the feedback agents 20, 22, 24 with one or more options for subsequent steps or sequence of steps in that workflow.

Furthermore, the data repository 26 may be configured to record and store sequence of steps performed by the user and/or components as corresponding workflows. Subsequently, the data repository 26 may be configured to aid in replaying the recorded sequence of steps or repetitive tasks to the user via use of audio and/or visual prompts, thereby aiding in enhancing productivity of the user.

Reference numeral 28 may be representative of a user input device. The user input device 28 may include a mouse, a joystick, a keyboard, or the like. It may be noted that the user input device 28 may be configured to accept input from the user and translate the user input into corresponding commands to an associated component. The user input may include an audio input and/or other forms of mechanical stimulation. As noted hereinabove, the components in the machine may be configured to operate in the reactive or on demand mode and the demonstration mode based on an input from the user. The user input device 28 may be configured to aid the user in issuing these commands.

Moreover, the system 10 for dynamically providing feedback to the user is configured to provide feedback to the user in the form of visual and/or audio outputs. These outputs or prompts may be communicated to the user via use of an output device 30. The output device may include a display, a pattern of lights, a device capable of presenting audio signals to the user, or combinations thereof. The audio output may include a predetermined audio signal or sequence of audible signals at certain predetermined frequencies. These audio signals may also include a voice, such as a human voice, where the human voice may be a prerecorded voice or a dynamically synthesized voice. Further, the visual output may include a visual pattern of lights. In one embodiment, the visual pattern of lights may include substantially similar lights or patterns of characters that are representative of the predetermined visual prompt. However, in certain other embodiments, the visual pattern of lights may include lights of different colors or patterns of characters that are representative of the predetermined visual prompt. Additionally, if the visual output includes text matter, the text matter may be made available to the user via a monitor or liquid crystal display (LCD) screen corresponding to the various components in the machine 12.

In accordance with further aspects of the present technique, the components 14, 16, 18 may also be configured to proactively and/or reactively (on-demand) provide inputs to the data repository 26, thus forming a feedback loop. In other words, the components 14, 16, 18 may be allowed to proactively and/or reactively extract output from the data repository 26. Similarly, the data repository 26 may also be allowed to proactively and/or reactively draw inputs from and provide outputs to the components. This feedback loop allows the data repository 26 to "learn" any new sequence of steps in a workflow. Thus, this feedback loop may be configured to continually enhance the output at the components 14, 16, 18.

Moreover, the system 10 may also be configured to use the ability of the components 14, 16, 18 in the machine 12 to extract learnt and/or pre-stored data from the data repository and directly feed them to another machine or equipment. In addition, the system 10 may also be configured to compare a sequence of steps against another sequence of steps. By way of example, proficiency of a new user of the system 10 may be monitored and/or tested by asking the new user to operate the machine 10 and subsequently initiate a comparison of the sequence of steps performed by the new user with a corresponding pre-stored or learnt sequence of steps extracted from the data repository 26. Also, the system 10 may be configured to extract a certain sequence of steps from a workflow stored in the data repository 26, manipulate the extracted sequence of steps, and/or insert the manipulated sequence of steps into another workflow. This modified workflow may then be fed back to the machine 12, thus altering the behavior of the machine 12. Reference numeral 32 may be indicative of other accessibility-based inputs and/or outputs that may be used to facilitate communication of feedback to the user.

Figure 2:
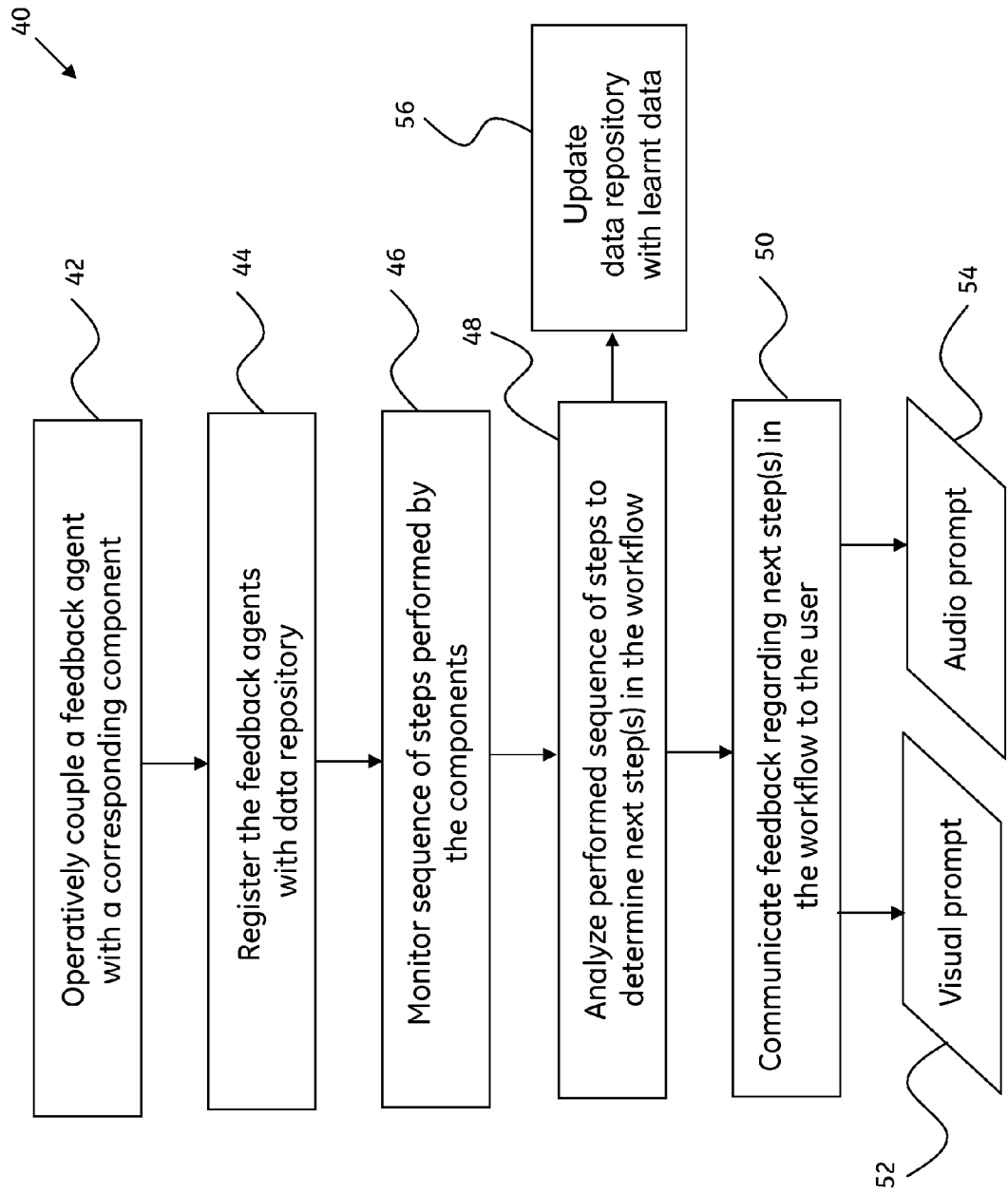
FIG. 2 is a flow chart illustrating an exemplary method for dynamically providing feedback using the exemplary system for dynamically providing feedback of FIG. 1, in accordance with aspects of the present technique.

Furthermore, in accordance with aspects of the present technique, an exemplary method for dynamically providing feedback to a user is presented. More particularly a method for dynamically providing feedback to the user based upon a step or sequence of steps performed by one or more components in a machine is presented. Turning now to FIG. 2, a flow chart 40 representative of an exemplary method for providing feedback to a user is illustrated. The method starts at step 42, where at least one feedback agent may be operatively associated with a component in a machine, for example. In other words, if a machine or device, such as the machine 12 (see FIG. 1) includes N components 14, 16, 18, a feedback agent may be operatively coupled with one or more components in the machine 12. Alternatively, only a subset of the components 14, 16, 18 may be operatively associated with a corresponding feedback agent. The feedback agent may be configured to proactively and/or reactively provide feedback to the user via a mechanism of continual prompting, feedback and learning.

Additionally, as previously noted with reference to FIG. 1, the system 10 may include a data repository 26, where the data repository 26 is configured to include pre-stored data, learnt data, or a combination thereof. Also, the data repository 26 may be configured to aid the feedback agents in dynamically providing to the user based upon the sequence of steps performed by the components 14, 16, 18 in the machine 12. Accordingly, the feedback agents corresponding to the components may be registered with a data repository, such as the data repository 26, as indicated by step 44.

Moreover, the system 10 may be configured to dynamically provide feedback to the user based upon the sequence of steps performed by the components 14, 16, 18. Accordingly, at step 46, the one or more feedback agents may be configured to monitor a step or a sequence of steps performed by a corresponding component. By way of example, the first feedback agent 20 (see FIG. 1) associated with the first component 14 (see FIG. 1) in the machine 12 may be configured to monitor the sequence of steps performed by the first component 14.

Further, the feedback agents associated with the respective components are configured to provide the user with feedback regarding the next step or sequence of steps to follow in the workflow based on the sequence of steps performed by that component. More particularly, the feedback agent may be configured to communicate information associated with the sequence of steps performed by the corresponding component to the data repository.

Once the data repository receives the information regarding the sequence of steps performed by the component from the corresponding feedback agent, the data repository may be configured to analyze the performed sequence of steps to determine next step(s) that may performed in the workflow, as depicted by step 48. In other words, the data repository may be configured to search the pre-stored data for any pattern of sequence of operations that substantially matches the sequence of steps performed by the components. Additionally, the data repository may also be configured to generate one or more viable options of next sequence of steps based on the performed sequence of operations, if a suitable match is not found in the pre-stored data. Furthermore, once the feedback agent receives feedback from the data repository, the feedback agent may be configured to communicate that feedback to the user, as indicated by step 50. Steps 48-50 may be better understood with reference to FIG. 3.

Figure 3:
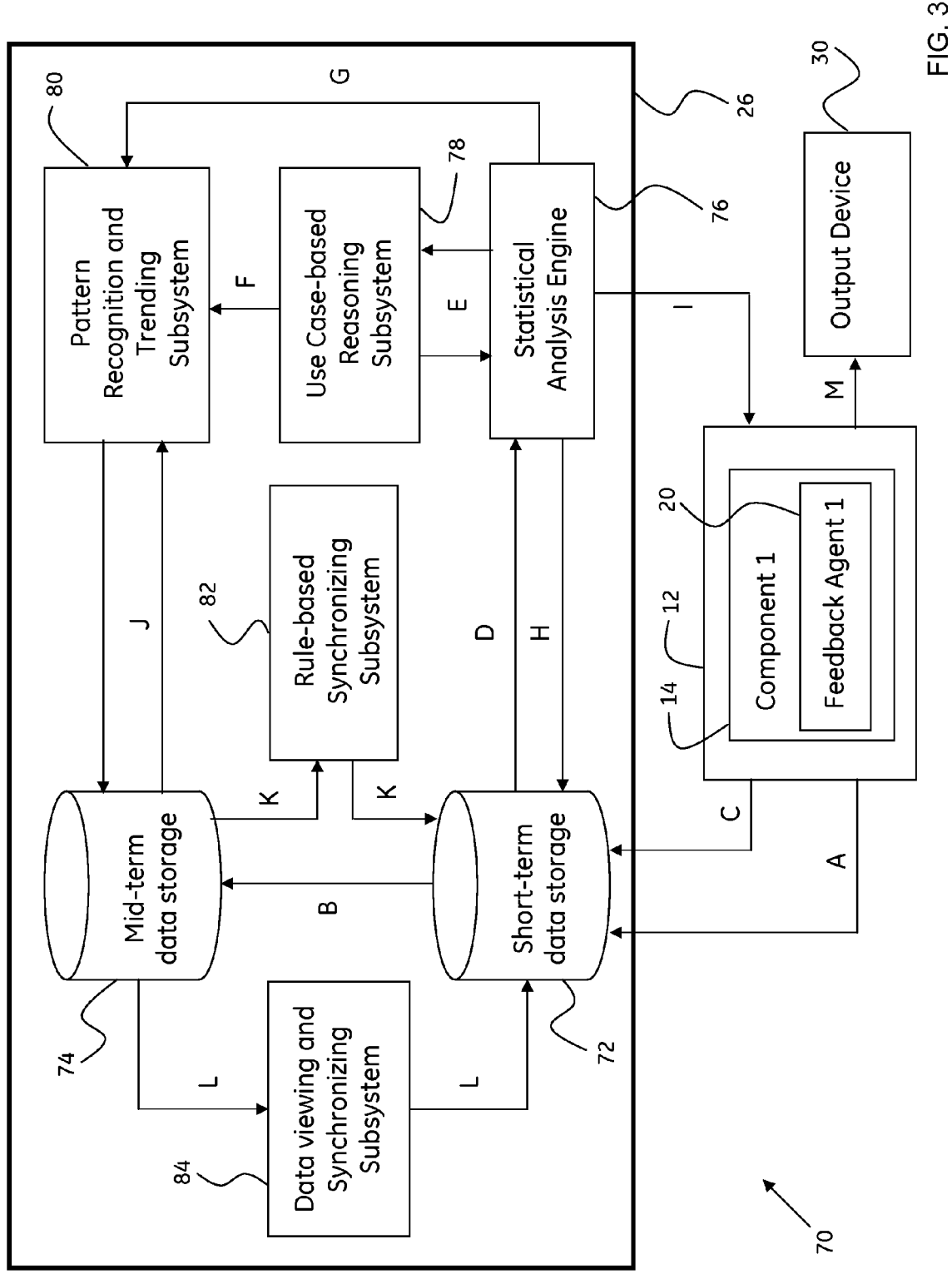
FIG. 3 is a diagrammatic illustration of the method of providing feedback, in accordance with aspects of the present technique.

Referring now FIG. 3, a diagrammatic illustration 70 of steps 48-50 is depicted. More particularly, one example of a solution workflow for one component in a machine is depicted in FIG. 3. It may be noted that a substantially similar logical flow may be applicable to the other components in the machine. In the example illustrated in FIG. 3, the working of steps 48-50 is described with reference to the first component 14 (see FIG. 1) and the corresponding first feedback agent 20 (see FIG. 1).

The data repository 26 (see FIG. 1) is shown as including short-term data storage 72 and mid-term data storage 74. It may be noted that, in accordance with aspects of the present technique, the short-term data storage 72 may be configured for use in the registration of feedback agents. The short-term data storage 72 may also be used to facilitate short term storage of results of data analysis. In addition, predictive data may be backed up in the short term data storage 72. Further, the mid-term data storage 74 may be configured for storage of predictive data. In addition, the mid-term data storage 74 may also be used to serve as a back up storage of short term data.

A machine, such as the machine 12, and the components of the machine 12 may be registered with the short-term data storage 72. In other words, the first component 14 may be registered with the short-term data storage 72. In addition, a feedback agent associated with the first component 14, such as the first feedback agent 20 may also be registered with the short-term data storage 72, as indicated by step "A". Subsequently, as indicated by step "B", the first feedback agent 20 may be synchronized with the mid-term data storage 74.

As noted hereinabove, the first feedback agent 20 may be configured to provide feedback to the user regarding the next step(s) in the workflow based on the sequence of steps performed by the first component 14. More particularly, the first feedback agent 20 may be configured to query the data repository 26 to obtain the next step(s) and then communicate the feedback to the user in the form of visual and/or audio prompts. Accordingly, one or more sequence of steps associated with the first component 14, one or more parameters associated with the first component 14, or a combination thereof, may be monitored. By way of example, the sequence of steps performed by the first component 14 may include a sequence of steps in a defective part isolation process, an image quality calibration process, or a component assembly process, to name a few. Furthermore, the one or more parameters associated with the first component 14 include X-ray dose parameters, a detector aperture, or coolant levels, to name a few. Information regarding the monitored sequence of steps or monitored parameters may then be communicated by the first feedback agent 20 to the short-term data storage 72 for storage, as indicated by step "C".

Once the data repository 26 receives a request for feedback, the data repository may be configured to analyze the stored data to provide an appropriate response. As noted hereinabove, the request may be proactive, by user request, or a combination thereof. Following the receipt of the request from the first feedback agent 20, the short-term data storage 72 may be configured to communicate the relevant information to a statistical analysis engine 76, as depicted by step "D". In other words, information regarding the sequence of steps performed by the first component 14 may be retrieved from the short-term data storage 72 and communicated to the statistical analysis engine 76. The statistical analysis engine 76 may be configured to process the information communicated by the short-term data storage 72 to aid in the search and/or generation of feedback to the first component 14. Accordingly, at step "E", the statistical analysis engine 76 may correspond with a simple case-based reasoning subsystem 78. The simple case-based reasoning subsystem 78 may be configured to facilitate use case-based reasoning to aid in the search for next steps corresponding to the sequence of steps performed by the first component 14.

Further, as indicated by step "F", the simple case-based reasoning subsystem 78 may also be configured to push data to a pattern recognition and trending subsystem 80, where the pattern recognition and trending subsystem 80 may be configured to aid in additional analysis. In certain embodiments, the pattern recognition and trending subsystem 80 may include an artificial intelligence (AI) subsystem. Moreover, at step "G", the statistical analysis engine 76 may also push data directly to the pattern recognition and trending subsystem 80 for trend analysis and pattern recognition.

Subsequently, at step "H", results of processing by the statistical analysis engine 76, the use case-based reasoning subsystem 78, and the pattern recognition and trending subsystem 80, namely feedback corresponding to the received request, may be communicated from the statistical analysis engine 76 to the short-term data storage 72 for storage. In addition, the feedback may also be communicated to the first component 14, as indicated by step "I". This feedback may include critical short-term findings. As previously noted, the feedback may be communicated to the user in the form of visual prompts and/or audio prompts.

In addition, for a more detailed analysis, the pattern recognition and trending subsystem 80 may also be configured to obtain relevant information from the mid-term data storage 74 and also communicate any findings back to the mid-term data storage, as depicted by step "J". Subsequently, at step "K", this feedback may then be synchronized via use of a rule-based synchronizing subsystem 82. Also, at step "K" the rule-based synchronizing subsystem 82 may also be configured to communicate this feedback to the short-term data storage 72. In addition, as depicted by step "L", the data from the mid-term storage 74 may be processed by a data viewing and synchronizing subsystem 84 to prepare the data for presentation to the user. Furthermore, at step "L", the data processed by the data viewing and synchronizing subsystem 84 may be communicated to the short-term data storage module 72.

Once the feedback is communicated back to the first component 14, the first feedback agent 20 may be configured to communicate this feedback to the user via use of an output device, such as the output device 30 (see FIG. 2), as indicated by step "M". The feedback may be presented to the user as a visual prompt, an audio prompt, or a combination thereof.

The method for dynamically providing feedback to the user, and more particularly, steps 48-50 (see FIG. 2) described hereinabove presents one solution path for providing feedback to the user and is described with reference to the first component 14. It may be noted that a substantially similar logical flow may also be employed with other components in the machine 12 that have corresponding feedback agents.

FIG. 4 illustrates an example of a table 90 of visual and/or audio outputs that may be communicated to the user based on processing by the feedback agent and the data repository. Reference numeral 92 may be representative of an output or prompt that is communicated to the user, while an interpretation of the prompt 92 may be represented by reference numeral 94. In addition, reference numeral 96 may be representative of rows in the table 90. Also, in the present example, the messages 92 in the table 90 may be representative of warning messages that are indicative of probable wrong scenarios that a user may select while operating the respective components in the machine. By way of example, referring to the third row in the table 90, during a clinical procedure, such as a cardiac spin, for example, once the patient table is rotated, a feedback agent associated with the patient table may be configured to inform the data repository about the rotation of the patient table. Once the patient table is fixed, if the user attempts to select a spin mode, the feedback agent corresponding to the patient table in association with the data repository may be configured to deduce that the selection of the user is invalid, as the patient table has been fixed. Consequently, the data repository may be configured to provide feedback to the user about the invalid selection. This feedback may be displayed as a text message on a display or in the form of warning lights. Alternatively, the feedback may be presented to the user in the form of an audio message. It may be noted that this feature of the system configured to provide feedback to the user may be turned off or on depending upon a skill level of the user. For example, if the user is a beginner, this feedback procedure may be turned on, while for an experienced user, this mode of warnings may be turned off.

In another example, during a particular procedure, the user may perform a particular step or sequence of steps and temporarily pause the workflow, for instance. According to aspects of the present technique, feedback agents associated with various components in the machine under consideration may be configured to monitor the step or sequence of steps performed by the various components. Once a predetermined threshold of a wait time has been exceeded, the feedback agents along with the data repository may be configured to proactively inform the user that wait time has exceeded the predetermined threshold via an audio prompt or a visual prompt. By way of example, an audio message may be played to the user, where the message may be indicative of the feedback. In another embodiment, after the predetermined threshold has been exceeded, the visual prompt in the form of a blinking light or a text message may be presented to the user.

The system 10 and method for dynamically providing feedback to the user may also be configured for use in the service industry, for example. While servicing a machine or equipment, a field service engineer typically follows service manuals to aid in diagnosing and/or fixing areas of failure associated with the machine. In other words, the system for providing feedback described hereinabove may be used such that each area of failure may be configured to provide feedback to the field service engineer. More particularly, the feedback may be indicative of problem resolution, decision trees for further action, proactive safety warnings, or predictions on future performance.

Furthermore, the system 10 and method for dynamically providing feedback to the user may also be configured to aid the user in dealing with complex workflows in complex machines or equipment. By way of example, the system 10 and method for dynamically providing feedback to the user may be employed to aid the user in performing workflows in assembly lines. The method for dynamically providing feedback may also be configured to record and replay sequences of operations or activities in machines or equipment with or without visual and/or audible prompts, consequently resulting in improved productivity through a process of learning and ability to replay repetitive tasks. This may be very useful in an evolving assembly line, where a current assembly line is an improvement over an earlier one. Thus, by either recording an exact sequence of steps or activities or learning the earlier assembly line, and then providing the necessary changes to the workflow, a new assembly line workflow may be generated.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java or in paradigms like Service Oriented Architecture. Such code, as will be appreciated by those of ordinary skill in the art, may be stored or adapted for storage on one or more tangible, machine readable media, such as on memory chips, local or remote hard disks, optical disks (that is, CDs or DVDs), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The system for dynamically providing feedback to the user and the method for dynamically providing feedback to the user described hereinabove may be advantageously employed to dramatically reduce loss of productivity and enhance workflows in a wide variety of applications, such as the service industry, assembly lines, medical domain, to name a few. In addition, the system method for dynamically providing feedback to the user may be used to test the proficiency of new users while handling unique workflows of complex machines and/or equipment. Furthermore, the system and method described hereinabove allow extraction and manipulation of a certain sequence of steps from a workflow stored in the data repository to generate new workflows. Also, using the system and method for dynamically providing feedback, workflows may easily duplicated for use in other machines. Moreover, use of the system and method for dynamically providing effective and immediate feedback to the user regarding usage of machines and equipment facilitates real-time ability to draw inferences on the machine or equipment, thereby allowing targeted enhancements and improvements on the machine and/or workflows. Additionally, loss in productivity while seeking expert advice towards handling and/or utilizing machines or equipment may be substantially reduced.

The above-description of the embodiments of the system for dynamically providing feedback and the method for dynamically providing feedback have the technical effect of enhancing workflows by providing effective and immediate feedback to the user regarding usage of machines and equipment, thereby allowing real-time ability to draw inferences on the machine or equipment.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for dynamically providing feedback, the method comprising:
   operatively associating one or more feedback agents with one or more components in a machine;
   monitoring one or more steps performed by the one or more components in the machine, wherein the one or more steps are associated with a workflow;
   analyzing the one or more steps performed by the one or more components to dynamically determine feedback based on the one or more steps performed by the one or more components, wherein the feedback comprises subsequent steps to be performed in the workflow; and
   presenting the feedback.

2. The method of claim 1, further comprising storing one or more predetermined workflows in a data repository.

3. The method of claim 2, further comprising operatively associating a feedback agent with each of the one or more components in the machine.

4. The method of claim 3, further comprising registering the feedback agent corresponding to each of the one or more components with the data repository.

5. The method of claim 1, wherein dynamically determining feedback based on the one or more steps performed by the one or more components comprises:
   retrieving data associated with the one or more steps performed by the one or more components; and
   processing the retrieved data by performing statistical analysis of the retrieved data to generate statistically confident feedback.

6. The method of claim 5, further comprising storing the statistically confident feedback in the data repository to enhance a knowledge base of the data repository.

7. The method of claim 1, wherein presenting the feedback comprises providing a visual output, an audio output, or a combination thereof.

8. The method of claim 7, wherein the visual output comprises a visual pattern of lights of similar or different colors, patterns of characters, text, or combinations thereof.

9. The method of claim 7, wherein the audio output comprises a predetermined audio signal, a sequence of audio signals, a prerecorded voice, a dynamically synthesized voice, or combinations thereof.

10. The method of claim 7, further comprising selecting a mode of presenting feedback.

11. The method of claim 10, wherein providing a visual output, an audio output, or a combination thereof comprises proactively providing feedback based upon operation of a sequence of steps by the one or more components in the machine.

12. The method of claim 10, wherein providing a visual output, an audio output, or a combination thereof comprises proactively providing feedback based upon operation of a sequence of steps performed by the one or more components in the machine and a predetermined delay in the operation of the steps.

13. The method of claim 10, wherein providing a visual output, an audio output, or a combination thereof comprises reactively providing feedback based upon a trigger.

14. The method of claim 13, wherein the trigger comprises a mechanical stimulation, an audio stimulation, or a combination thereof.

15. The method of claim 10, wherein providing a visual output, an audio output, or a combination thereof comprises proactively providing feedback in a demonstration mode.

16. A method for dynamically providing feedback, the method comprising:
   operatively associating one or more feedback agents with one or more components in a machine;
   selecting a mode of presenting feedback;
   monitoring one or more steps performed by the one or more components in the machine, wherein the one or more steps are associated with a workflow;
   analyzing the one or more steps performed by the one or more components to dynamically determine feedback based on the one or more steps performed by the one or more components, wherein the feedback comprises other steps in the workflow; and
   presenting the determined feedback.

17. A system for dynamically providing feedback, the system comprising:
   a data repository configured to facilitate generation of feedback based on one or more steps performed by one or more components in a machine; and
   one or more feedback agents associated with the one or more components in the machine, wherein the one or more feedback agents are operatively coupled to the data repository, and wherein the one or more feedback agents are configured to aid in dynamically providing feedback based on the one or more steps performed by one or more components in a machine.

18. The system for dynamically providing feedback of claim 17, wherein the one or more feedback agents are configured to monitor the one or more steps performed by the one or more components in the machine, wherein the one or more steps are associated with a workflow.

19. The system for dynamically providing feedback of claim 17, wherein one or more predetermined workflows are stored in the data repository.

20. The system for dynamically providing feedback of claim 17, wherein the data repository is configured to:
   retrieve data associated with the one or more steps performed by the one or more components; and
   process the retrieved data by performing statistical analysis of the retrieved data to generate statistically confident feedback.

21. The system for dynamically providing feedback of claim 20, wherein the data repository is further configured to store the generated statistically confident feedback in the data repository to enhance a knowledge base of the data repository.

22. The system for dynamically providing feedback of claim 21, further comprising one or more output devices configured to present the feedback generated by the data repository, wherein the feedback comprises a visual output, an audio output, or a combination thereof.

23. The system for dynamically providing feedback of claim 22, further configured to allow selection of a mode of presenting feedback, wherein the mode of presenting feedback comprises a proactive mode, a reactive mode, a demonstration mode, or combinations thereof.

24. The system for dynamically providing feedback of claim 23, further comprising one or more input devices configured to allow selection of the mode of presenting feedback.

25. A computer readable medium comprising one or more tangible media, wherein the one or more tangible media comprise:
   code adapted to operatively associate one or more feedback agents with one or more components in a machine;
   code adapted to monitor one or more steps performed by the one or more components in the machine, wherein the one or more steps are associated with a workflow;
   code adapted to analyze the one or more steps performed by the one or more components to dynamically determine feedback based on the one or more steps performed by the one or more components, wherein the feedback comprises subsequent steps to be performed in the workflow; and
   code adapted to present the feedback.

* * * * *